United States Patent
Matsuura (10) Patent No.: US 10,226,835 B2
(45) Date of Patent: Mar. 12, 2019

(54) LASER PROCESSING SYSTEM

(71) Applicant: FANUC CORPORATION, Yamanashi (JP)

(72) Inventor: Yuuto Matsuura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 47 days.

(21) Appl. No.: 15/704,153

(22) Filed: Sep. 14, 2017

(65) Prior Publication Data

US 2018/0085852 A1 Mar. 29, 2018

(30) Foreign Application Priority Data

Sep. 29, 2016 (JP) .................... 2016-191504

(51) Int. Cl.
*B23K 26/00* (2014.01)
*B23K 26/70* (2014.01)
(Continued)

(52) U.S. Cl.
CPC ............ *B23K 26/02* (2013.01); *B23K 26/702* (2015.10); *H01S 3/02* (2013.01)

(58) Field of Classification Search
CPC .............. B23K 26/0884; B23K 26/032; B23K 26/082; B23K 26/02; B23K 26/035;
(Continued)

(56) References Cited

U.S. PATENT DOCUMENTS 4,623,229 A * 11/1986 Galan .................... B23K 26/02
219/121.63
4,866,238 A * 9/1989 Karube .............. B23K 26/0884
219/121.78
(Continued)

FOREIGN PATENT DOCUMENTS

JP S63-030192 A 2/1988
JP H01-245988 A 10/1989
(Continued)

OTHER PUBLICATIONS

Japanese Decision to Grant a Patent dated Jul. 10, 2018, in connection with corresponding JP Application No. 2016-191504 (6 pgs., including English translation).
(Continued)

*Primary Examiner* — David A Vanore
(74) *Attorney, Agent, or Firm* — Maier & Maier, PLLC (57) ABSTRACT

A laser processing system includes a laser processing apparatus having a laser oscillator, a processing apparatus main body, and a laser nozzle that is provided in the processing apparatus main body, a robot for transferring a workpiece to a machining position of the laser nozzle to perform predetermined machining for the workpiece, an output measurement instrument that is located at a standby position provided in the processing apparatus main body and that is capable of measuring output of the laser beam from the laser nozzle, and a robot controller for controlling operation of the robot, wherein the robot controller controls the robot to support the output measurement instrument located at the standby position and to move the output measurement instrument to an irradiation position of the laser beam of the laser nozzle for measurement of the output.

4 Claims, 6 Drawing Sheets

(51) Int. Cl.
*B23K 26/02* (2014.01)
*H01S 3/02* (2006.01)

(58) Field of Classification Search
CPC ..... B23K 26/08; B23K 26/702; B22F 3/1684; B22F 2003/1056; B25J 9/1664; B25J 9/1684; B25J 9/1692; B29C 64/30; B33Y 40/00
USPC ....... 700/245, 264, 186; 219/121.63, 121.79, 219/121.82, 121.84, 121.85, 124.22; 250/492.1; 359/845, 862, 872
See application file for complete search history.

(56) References Cited

U.S. PATENT DOCUMENTS

| | | | | |
|---|---|---|---|---|
| 4,877,325 | A * | 10/1989 | Weule | G01B 11/26 |
| | | | | 356/622 |
| 5,024,968 | A | 6/1991 | Engelsberg | |
| 5,093,552 | A * | 3/1992 | Torii | B23K 26/0884 |
| | | | | 219/121.62 |
| 5,099,557 | A | 3/1992 | Engelsberg | |
| 5,531,857 | A | 7/1996 | Engelsberg et al. | |
| 5,643,472 | A | 7/1997 | Engelsberg et al. | |
| 5,718,832 | A * | 2/1998 | Mori | B23K 26/032 |
| | | | | 219/121.67 |
| 5,777,294 | A * | 7/1998 | Sugahara | B23K 26/08 |
| | | | | 219/121.67 |
| 5,821,175 | A | 10/1998 | Engelsberg | |
| 5,948,292 | A * | 9/1999 | Tanaka | B23K 26/046 |
| | | | | 219/121.6 |
| 5,958,268 | A * | 9/1999 | Engelsberg | B08B 7/0042 |
| | | | | 134/1 |
| 6,048,588 | A | 4/2000 | Engelsberg et al. | |
| 6,204,475 | B1 * | 3/2001 | Nakata | B23K 26/147 |
| | | | | 219/121.84 |
| 6,340,875 | B1 * | 1/2002 | Watanabe | B25J 9/163 |
| | | | | 318/568.11 |
| 6,680,461 | B2 * | 1/2004 | Watanabe | B23K 26/04 |
| | | | | 219/121.78 |
| 7,092,791 | B2 * | 8/2006 | Terada | B23K 26/0884 |
| | | | | 700/245 |
| 7,164,099 | B2 * | 1/2007 | Hata | B23K 26/067 |
| | | | | 219/121.77 |
| 7,385,157 | B2 * | 6/2008 | Oda | B23K 26/0608 |
| | | | | 219/121.63 |
| 8,134,098 | B2 * | 3/2012 | Muratsubaki | B23K 26/146 |
| | | | | 219/121.67 |
| 2001/0027964 | A1 * | 10/2001 | Isaji | B23K 26/03 |
| | | | | 219/121.62 |
| 2005/0107918 | A1 * | 5/2005 | Watanabe | B25J 9/1684 |
| | | | | 700/245 |
| 2005/0143861 | A1 * | 6/2005 | Watanabe | B25J 9/1684 |
| | | | | 700/264 |
| 2006/0204869 | A1 * | 9/2006 | Kakui | G21B 1/05 |
| | | | | 430/30 |
| 2007/0257012 | A1 * | 11/2007 | Wile | B23K 26/0673 |
| | | | | 219/121.7 |
| 2009/0127233 | A1 * | 5/2009 | Asano | B23K 26/032 |
| | | | | 219/121.7 |
| 2009/0152250 | A1 * | 6/2009 | Chang | B23K 26/032 |
| | | | | 219/121.73 |
| 2012/0255938 | A1 * | 10/2012 | Oe | B23K 26/0884 |
| | | | | 219/124.22 |
| 2018/0043471 | A1 * | 2/2018 | Aoki | B23K 26/0884 |
| 2018/0065181 | A1 * | 3/2018 | Mori | B22F 3/105 |
| 2018/0065208 | A1 * | 3/2018 | Mori | B23B 3/22 |
| 2018/0141155 | A1 * | 5/2018 | Furuya | B23K 26/702 |
| 2018/0221990 | A1 * | 8/2018 | Aoki | B23K 26/032 |
| 2018/0333805 | A1 * | 11/2018 | Matsumoto | B23K 26/0884 |
| 2018/0354070 | A1 * | 12/2018 | Nogami | B23K 26/082 |

FOREIGN PATENT DOCUMENTS

| | | |
|---|---|---|
| JP | H07-505577 A | 6/1995 |
| JP | H09-5487 A | 1/1997 |
| JP | 2006-239697 A | 9/2006 |
| JP | 2009-291818 A | 12/2009 |
| JP | 2012-55960 A | 3/2012 |
| JP | 2016-028825 A | 3/2016 |
| WO | 93/19888 A1 | 10/1993 |

OTHER PUBLICATIONS

Japanese Search Report dated Jun. 22, 2018, in connection with corresponding JP Application No. 2016-191504 (15 pgs., including English translation).

* cited by examiner

LASER PROCESSING SYSTEM

CROSS-REFERENCE TO RELATED APPLICATIONS

This application is based on and claims priority to Japanese Patent Application No. 2016-191504 filed on Sep. 29, 2016, the entire content of which is incorporated herein by reference.

TECHNICAL FIELD

The present invention relates to a laser processing system in which a workpiece is transferred by a robot to an irradiation position of a laser nozzle provided in a processing apparatus main body for processing the workpiece.

BACKGROUND ART

Conventionally, there is known a laser processing apparatus for irradiating a machining surface of a workpiece by a laser beam output from a laser beam source, constantly monitoring the laser beam reflected by the machining surface by a reflected light monitoring unit, and issuing an alarm if a detection value of the reflected light monitoring unit is smaller than a predetermined value (for example, see PTL 1).

Also, there is known a laser processing system including a laser processing apparatus including a laser nozzle for radiating a laser beam downward, a light receiving body that is arranged below the laser nozzle, a first handle for moving the light receiving body in an X-axis direction, which is a horizontal direction, a second handle for moving the light receiving body in a Y-axis direction, which is a horizontal direction, a laser beam receiving unit that is attached to the light receiving body and that is capable of measuring an output from the laser nozzle, and a cover for covering the light receiving body so as to cover the laser beam receiving unit, and a manipulator (for example, see PTL 2).

According to this laser processing system, at the time of measuring an output from the laser nozzle, the cover of the light receiving body is removed by the manipulator, and the first and the second handles are operated by the manipulator and the laser beam receiving unit is moved to a position for measuring output from the laser nozzle, to thereby perform accurate output measurement.

CITATION LIST

Patent Literature

{PTL 1}
Japanese Unexamined Patent Application, Publication No. 2006-239697
{PTL 2}
Japanese Unexamined Patent Application, Publication No. 2016-28825

SUMMARY OF INVENTION

A laser processing system according to an aspect of the present invention includes a laser processing apparatus including a laser oscillator, a processing apparatus main body, and a laser nozzle that is provided in the processing apparatus main body and to which a laser beam is supplied from the laser oscillator; a robot which moves a workpiece to a machining position by the laser nozzle to perform predetermined machining for the workpiece; an output measurement instrument that is located at a standby position provided in the processing apparatus main body and that is capable of measuring output of the laser beam from the laser nozzle; and a robot controller for controlling operation of the robot, wherein the robot controller is configured to control the robot to support the output measurement instrument located at the standby position and to move the output measurement instrument to an irradiation position of the laser beam from the laser nozzle for measurement of the output.

DESCRIPTION OF EMBODIMENTS

Hereinafter, a laser processing system according to an embodiment of the present invention will be described with reference to the drawings.

Figure 1:
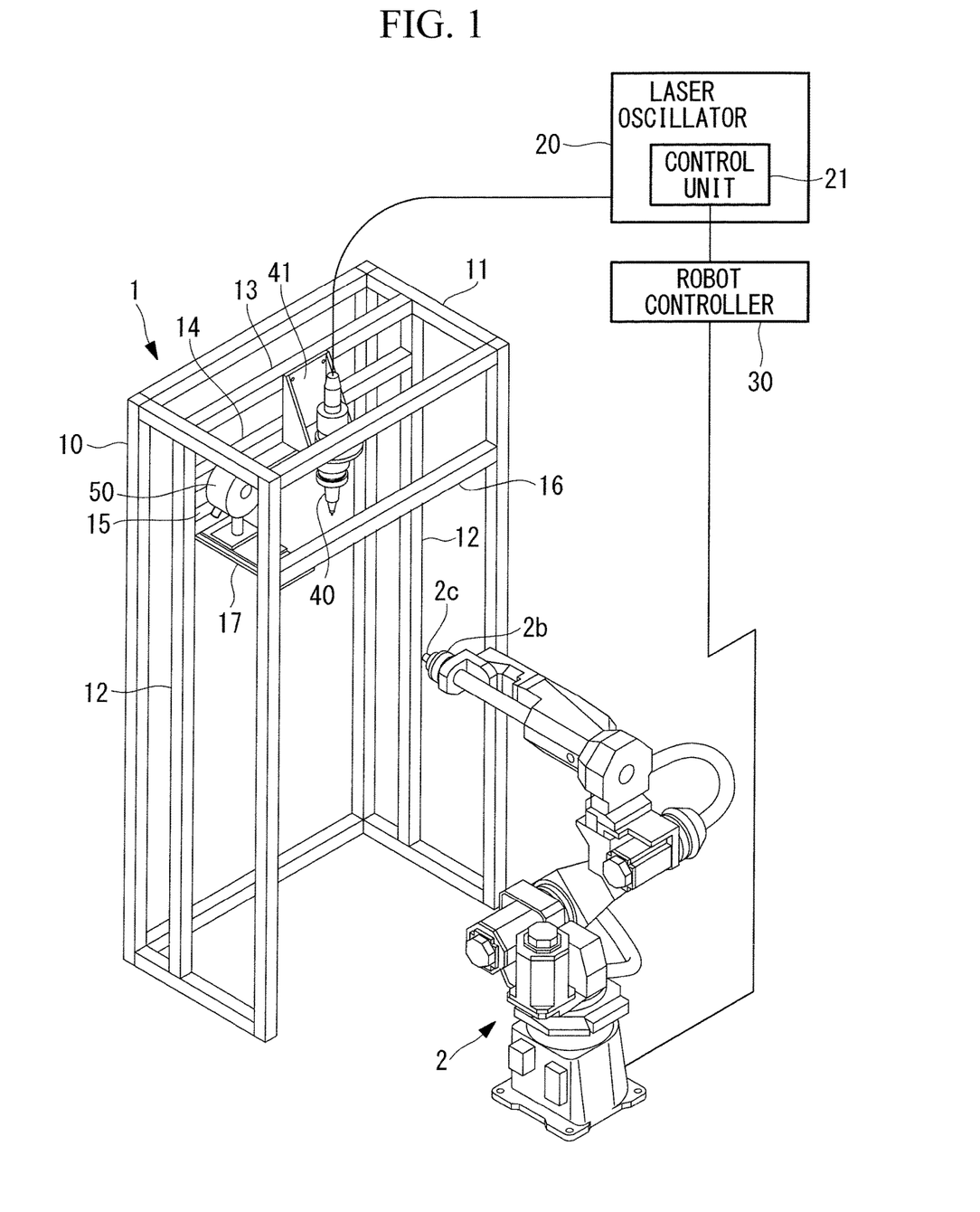
FIG. 1 is a perspective view of main parts of a laser processing system according to an embodiment of the present invention.

As shown in FIG. 1, the laser processing system includes a laser processing apparatus 1 and a robot 2.

The laser processing apparatus 1 includes a processing apparatus main body 10, a known laser oscillator 20, and a known laser nozzle 40, which is fixed at a predetermined position in the processing apparatus main body 10 and which is connected to the laser oscillator 20.

The processing apparatus main body 10 includes a rectangular frame 11 formed from a plurality of beams, and the frame 11 is fixed at a predetermined installation position. A beam 12 extending in the vertical direction is provided at a middle position in the front-back direction of the frame 11, on each of the left side and the right side, and a beam 13 extending in the left-right direction is provided at a middle position in the front-back direction of the frame 11, at the upper side. Also, a beam 14 extending between the left and right beams 12 is provided below the beam 13. Plates may be attached on the left side, the right side, the upper side, the back side and the like of the frame 11.

Also, a beam 15 extending between the left and right beams 12 is provided below the beam 14, and a beam 16 is fixed on the front side of the frame 11, at a height position of the beam 15. Moreover, a plate-shaped table 17 extending in the horizontal direction is fixed to the beam 15 and beam 16, and the table 17 is arranged at the left side of the frame 11. A cutout portion 17a (see FIG. 3) is provided in the table 17 in a manner penetrating the table 17 in the vertical direction.

An output measurement instrument 50, such as a power meter or an energy meter, which is capable of measuring output of a laser beam, is placed on the table 17, and this position is a standby position of the output measurement instrument 50.

The laser oscillator 20 includes a control unit 21 formed of a computer including a CPU, a RAM, a ROM and the like, and the intensity, the timing and the like of a laser beam supplied to the laser nozzle 40 are controlled by the control unit 21.

The laser nozzle 40 is fixed to the beam 13 and the beam 14 by a nozzle support member 41, and in the present embodiment, the laser nozzle 40 is configured to radiate a laser beam downward.

The robot 2 includes a plurality of movable parts, and also includes a plurality of servo motors 2a for driving respective movable parts. A master plate 2b of a tool changer is attached to a distal end portion of the robot 2.

As each servo motor 2a (see FIG. 5), various servo motors such as a rotation motor and a linear motor may be used. An operation position detection device, such as an encoder, for detecting an operation position is built in each servo motor 2a, and a detection value of the operation position detection device is transmitted to the robot controller 30.

Figure 5:
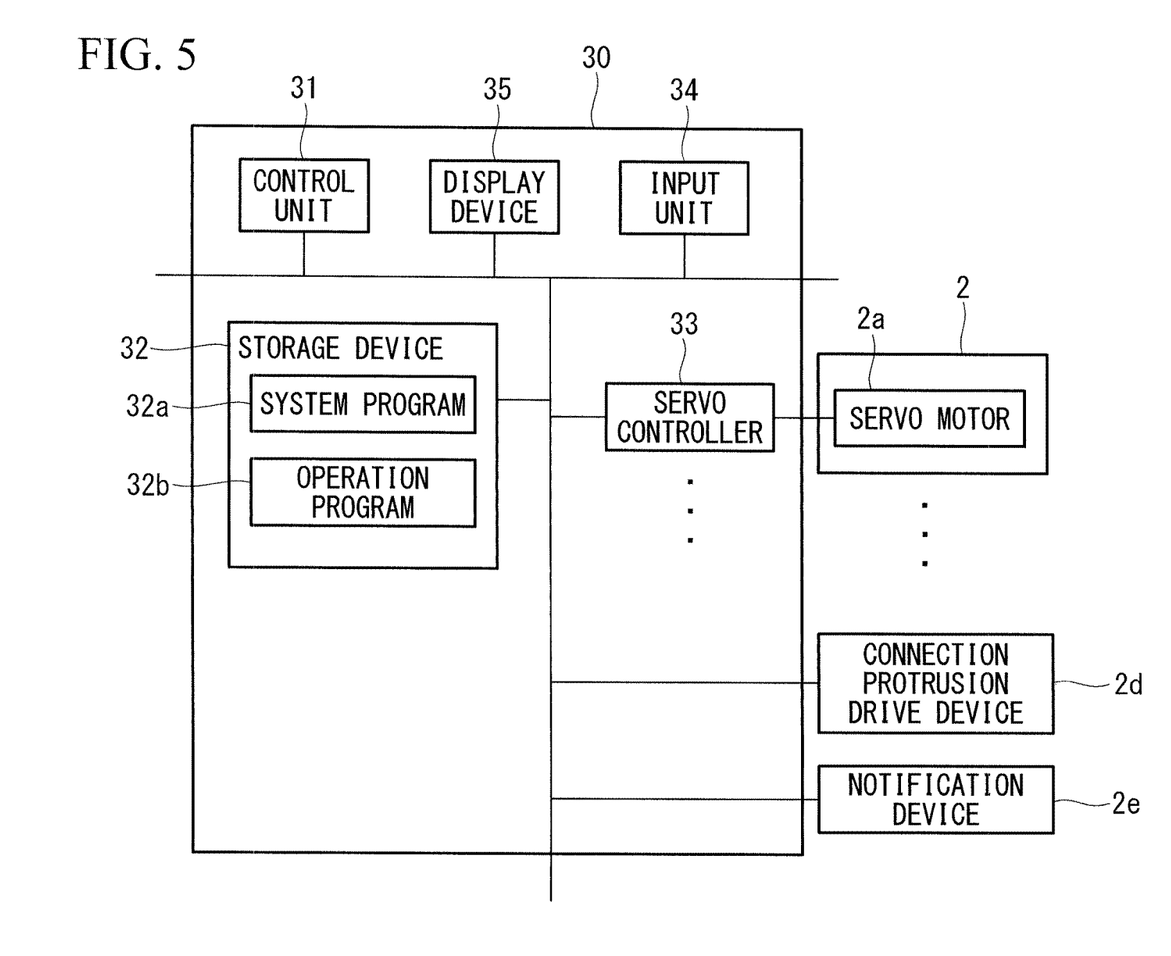
FIG. 5 is a block diagram showing main parts of the laser processing system of the embodiment.

As shown in FIG. 5, the robot controller 30 includes a control unit 31 formed of a computer including a CPU, a RAM, a ROM, and the like, a non-volatile storage device 32, a plurality of servo controllers 33 provided correspondingly to the respective servo motors 2a, an input unit 34 to be operated, for example, at the time of creation of an operation program of the robot 2, and a display device 35. Each servo controller 33 includes a processor, and storage devices such as a ROM, a RAM and the like, and controls the operation position, the operation speed, and the like of the corresponding servo motor 2a by transmitting a drive signal to a servo amplifier of the servo motor 2a.

A system program 32a is stored in the storage device 32, and the system program 32a provides the basic functions of the robot controller 30. Also, at least one operation program 32b created by using the input unit 34 or the like is stored in the storage device 32. For example, the control unit 31 of the robot controller 30 operates according to the system program 32a, and reads out an operation program 32b stored in the storage device 32 and temporarily stores the operation program 32b in the RAM.

Then, according to the operation program 32b read out, the control unit 31 transmits control signals to servo controllers 33, a connection protrusion drive device 2d such as a cylinder for switching a connection protrusion 2c of the master plate 2b between a clamping state and a non-clamping state, and a notification device 2e such as a known display device or alarm device, to thereby control the servo amplifier of each servo motor 2a, the connection protrusion drive device 2d, and the notification device 2e.

Also, the control unit 31 transmits, to the control unit 21 of the laser oscillator 20, a laser radiation command signal regarding the intensity, the timing and the like of a laser beam to be supplied to the laser nozzle 40.

Figure 4:
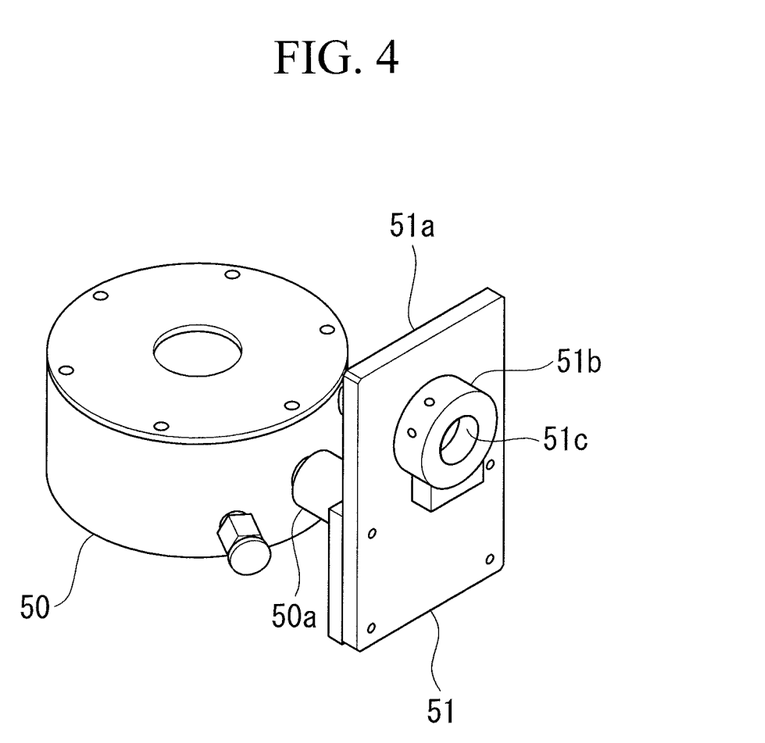
FIG. 4 is a perspective view of an output measurement instrument of the laser processing system of the embodiment.

As shown in FIG. 4, a tool plate 51, which is a tool-side member matching the master plate 2b at the distal end portion of the robot 2, is fixed to the output measurement instrument 50. The tool plate 51 includes a plate-shaped member 51a, an upper surface of which is fixed to a shaft 50a extending in a direction orthogonal to a light receiving axis of the output measurement instrument 50, a projection portion 51b projecting from a lower surface of the plate-shaped member 51a, and a connection hole 51c formed to the projection portion 51b.

Furthermore, the plate-shaped member 51a is placed on the table 17 so that the projection portion 51b is placed on the bottom side, and at this time, the projection portion 51b is exposed below the table 17 through the cutout portion 17a.

When the plate-shaped member 51a is placed on the table 17 in this manner, the output measurement instrument 50 is arranged at a position higher than a machining position of a laser beam from the laser nozzle 40.

With the laser processing system, the distal end portion of the robot 2 moves to a pre-machining storage location of workpieces, the connection protrusion 2c is inserted by the robot 2 into a predetermined position of the workpiece and a clamping state is achieved, the workpiece is arranged in an irradiation direction of the laser nozzle 40 by the robot 2 and laser processing is performed on the workpiece, and then, the workpiece after machining is transferred by the robot 2 to a predetermined post-machining storage location.

Moreover, the laser processing system is configured to perform, at a predetermined timing, output measurement for the laser nozzle 40. A predetermined timing may be arbitrarily set by operating the input unit 34 or the like, and may be at a predetermined time interval, or before the start of machining of a machining lot and/or the end of machining of the machining lot. An example operation of the control unit 31 for a case of performing output measurement for the laser nozzle 40 will be described below with reference to FIG. 6.

Figure 2:
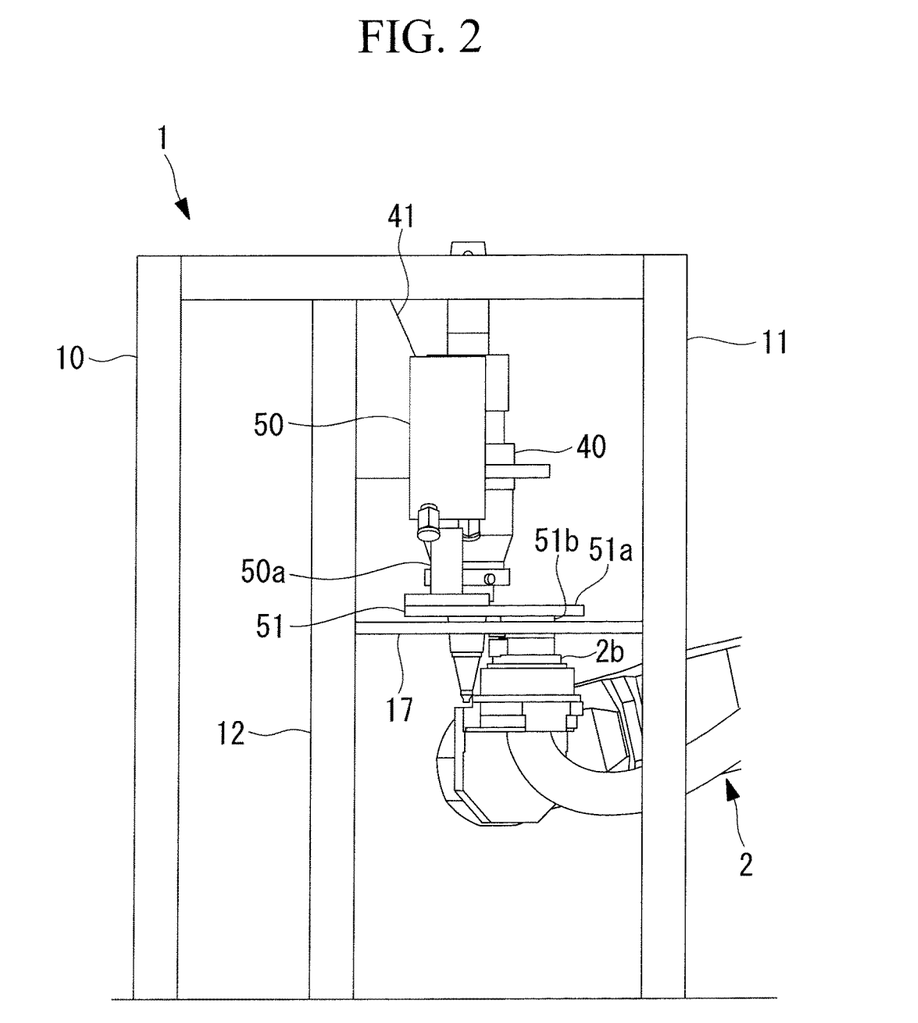
FIG. 2 is a side view of main parts of the laser processing system according to the embodiment.
Figure 6:
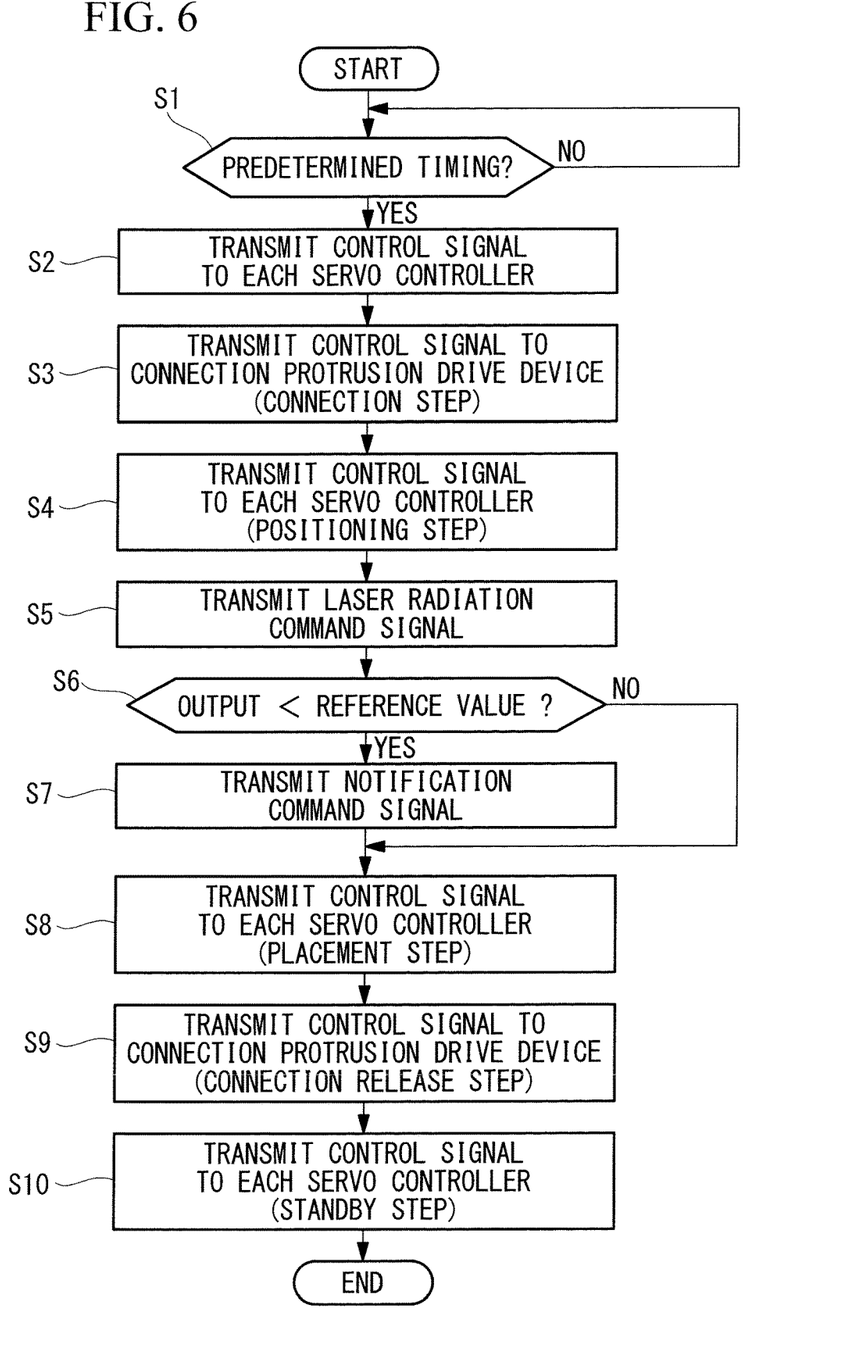
FIG. 6 is a flowchart showing operation of a control unit of the embodiment.

First, when the robot controller 30 reaches a predetermined timing (step S1), the control unit 31 transmits control signals to each servo controller 33 such that the master plate 2b at the distal end portion of the robot 2 is arranged below the table 17, as shown in FIG. 2, and the connection protrusion 2c of the master plate 2b is inserted into the connection hole 51c of the tool plate 51 of the output measurement instrument 50 (step S2).

Next, the control unit 31 transmits a control signal to the connection protrusion drive device 2d such that the connection protrusion 2c and the connection hole 51c are connected by protruding a protrusion, which is to be connected with the connection hole 51c, from an outer circumferential surface of the connection protrusion 2c (step S3).

Figure 3:
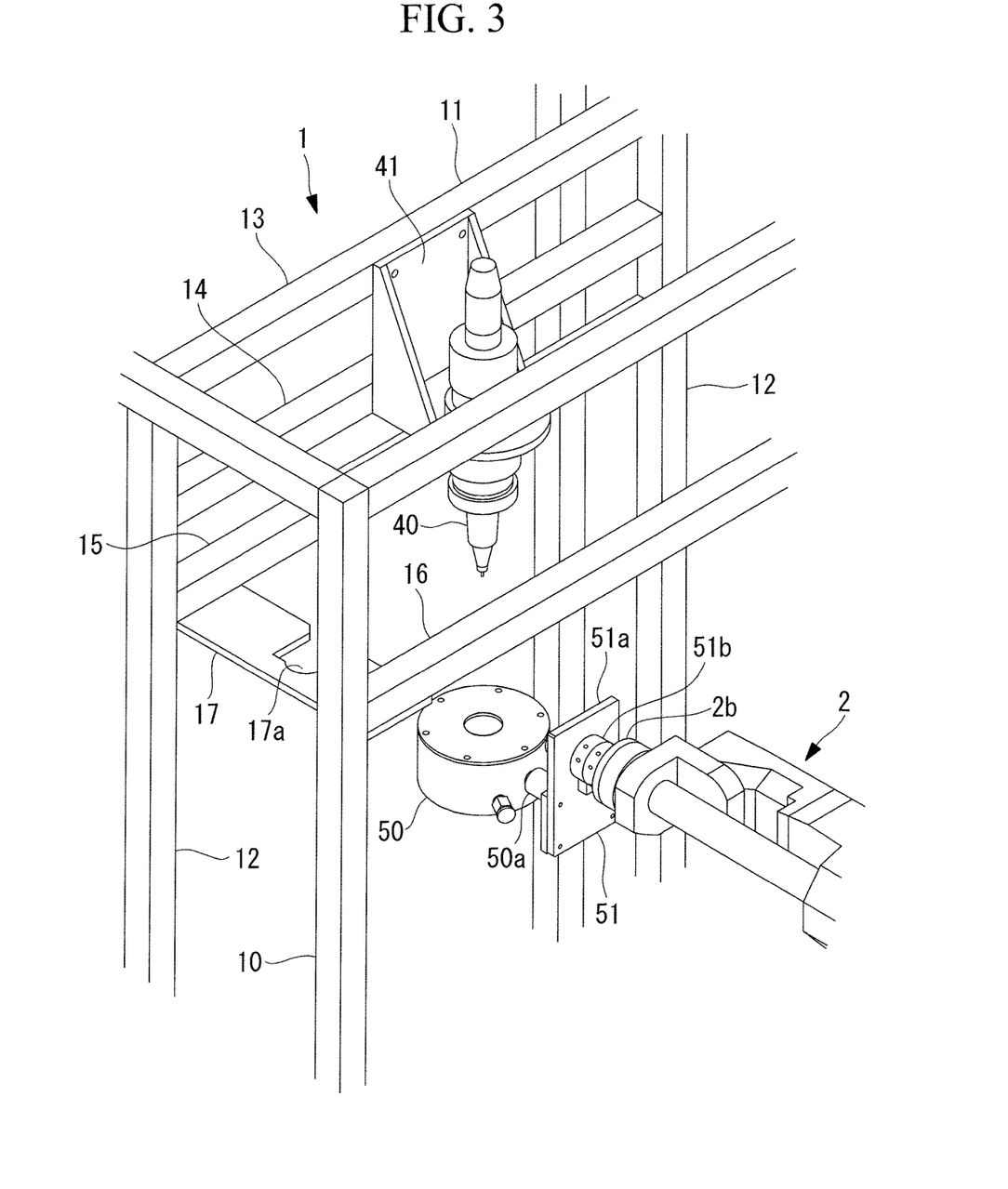
FIG. 3 is a perspective view of main parts of the laser processing system according to the embodiment.

Next, as shown in FIG. 3, the control unit 31 transmits a control signal to each servo controller 33 such that the output measurement instrument 50 is arranged at an irradiation position of the laser nozzle 40, and the light receiving axis of the output measurement instrument 50 and an irradiation axis of the laser nozzle 40 align with each other (step S4).

Subsequently, the control unit 31 transmits, to the control unit 21 of the laser oscillator 20, a laser radiation command signal for causing a laser beam of a predetermined intensity to be radiated for a predetermined period of time (step S5). Output of a laser beam is thereby measured by the output measurement instrument 50.

Next, in the case where the output measured by the output measurement instrument 50 is below a reference value (step S6), the control unit 31 transmits a notification command signal to the notification device 2e so as to cause a predetermined notification operation (step S7).

Next, the control unit 31 transmits a control signal to each servo controller 33 such that the plate-shaped member 51a is placed on the table 17 with the projection portion 51b on the bottom side, and the projection portion 51b is arranged inside the cutout portion 17a (step S8).

Subsequently, the control unit 31 transmits a control signal to the connection protrusion drive device 2d such that connection between the connection protrusion 2c and the connection hole 51c is released by the protrusion engaged with the connection hole 51c being housed inside the connection protrusion 2c (step S9). Then, the control unit 31 transmits a control signal to each servo controller 33 such that the robot 2 is moved to a predetermined standby position (step S10).

As described above, in the present embodiment, the output measurement instrument 50 is arranged at an output measurement position while being supported by the robot 2, and when output measurement is not performed, the output measurement instrument 50 is arranged at a standby position provided in the processing apparatus main body 10, and thus, the output measurement instrument 50 does not have to be arranged in a space near the laser nozzle 40 or at a machining position at the time of machining of a workpiece.

Furthermore, the notification device 2e is operated when a measured output is below a reference value, and thus, that an output of the laser nozzle is below a reference value can be reliably grasped, and there is an advantage that the quality of machining may be ensured.

Also, because the master plate 2b of the tool changer is attached to the distal end of the robot 2, the tool plate 51, which can be attached/detached to/from the master plate 2b, is attached to the output measurement instrument 50, and a workpiece has a shape allowing attachment/detachment to/from the master plate 2b, output measurement may be easily performed even during workpiece machining.

Moreover, because the standby position of the output measurement instrument 50 is a position that is higher than the machining position of a laser beam from the laser nozzle 40, chips and the like generated by machining of a workpiece are not easily scattered to the side of the output measurement instrument 50, and thus, there is an advantage that measurement by the output measurement instrument 50 may be accurately performed.

Additionally, in the present embodiment, the master plate 2b of the tool changer is provided at the distal end of the robot 2, but another mechanism capable of grasping and holding a workpiece or the output measurement instrument 50 may be adopted instead of the master plate 2b of the tool changer.

Moreover, instead of being placed on the table 17, the output measurement instrument 50 may be housed inside a case which is provided in the processing apparatus main body 10 and which is capable of housing the output measurement instrument 50, or may be hung from a hanging hook which is provided in the processing apparatus main body 10 and which is capable of hanging the output measurement instrument 50. In these cases, the position of the housed output measurement instrument 50 or the position of the hanging output measurement instrument 50 is the standby position.

Moreover, in the present embodiment, the laser nozzle 40 is fixed to the processing apparatus main body 10. Alternatively, a rail extending in the horizontal direction may be provided inside the processing apparatus main body 10, and the laser nozzle 40 may be provided in a manner capable of moving along the rail.

The inventor has arrived at the following aspects of the present invention.

A laser processing system according to an aspect of the present invention includes a laser processing apparatus including a laser oscillator, a processing apparatus main body, and a laser nozzle that is provided in the processing apparatus main body and to which a laser beam is supplied from the laser oscillator; a robot which moves a workpiece to a machining position by the laser nozzle to perform predetermined machining for the workpiece; an output measurement instrument that is located at a standby position provided in the processing apparatus main body and that is capable of measuring output of the laser beam from the laser nozzle; and a robot controller for controlling operation of the robot, wherein the robot controller is configured to control the robot to support the output measurement instrument located at the standby position and to move the output measurement instrument to an irradiation position of the laser beam from the laser nozzle for measurement of the output.

According to the aspect, the output measurement instrument is supported by the robot and is positioned at an output measurement position, and when output measurement is not performed, the output measurement instrument is located at a standby position provided in the processing apparatus main body, and thus, the output measurement instrument does not have to be arranged in a space near the laser nozzle or at the machining position at the time of machining of a workpiece.

In the aspect described above, the robot controller may control the robot to move the output measurement instrument to the irradiation position at a predetermined timing for measurement of the output, and in a case where measured output is below a reference value, the robot controller causes a predetermined notification device to operate.

With such a configuration, a fact that an output of the laser nozzle is below a reference value may be reliably detected, and there is an advantage that the quality of machining may be ensured.

In the aspect described above, a master plate of a tool changer may be attached to a distal end of the robot, and a tool-side member that is capable of being detachably attached to the master plate may be attached to the output measurement instrument.

With such a configuration, a workpiece may have a shape allowing attachment/detachment to/from the master plate, and thereby output measurement may be easily performed even during workpiece machining.

In the aspect described above, the standby position is preferably a position that is higher than the machining position of the laser beam from the laser nozzle.

According to such a configuration, chips and the like generated by machining a workpiece are not easily scattered toward the output measurement instrument, and thus, there is an advantage that measurement by the output measurement instrument may be accurately performed.

According to the aforementioned aspects, a space, which is near a laser nozzle or at a machining position, occupied for output measurement may be reduced or eliminated.

REFERENCE SIGNS LIST 1 laser processing apparatus
2 robot
2b master plate
2c connection protrusion
10 processing apparatus main body
17 table
20 laser oscillator
21 control unit
30 robot controller
31 control unit
40 laser nozzle
41 nozzle support member
50 output measurement instrument
51 tool plate

The invention claimed is:

1. A laser processing system comprising:

a laser processing apparatus including a laser oscillator, a processing apparatus main body, and a laser nozzle that is provided in the processing apparatus main body and to which a laser beam is supplied from the laser oscillator;

a robot which moves a workpiece to a machining position by the laser nozzle to perform predetermined machining for the workpiece;

an output measurement instrument that is located at a standby position provided in the processing apparatus main body and that is capable of measuring output of the laser beam from the laser nozzle; and a robot controller for controlling operation of the robot, wherein the robot controller is configured to control the robot to support the output measurement instrument located at the standby position and to move the output measurement instrument to an irradiation position of the laser beam from the laser nozzle for measurement of the output.

2. The laser processing system according to claim 1, wherein the robot controller controls the robot to move the output measurement instrument to the irradiation position at a predetermined timing for measurement of the output, and in a case where measured output is below a reference value, the robot controller causes a predetermined notification device to operate.

3. The laser processing system according to claim 1, wherein a master plate of a tool changer is attached to a distal end of the robot, and wherein a tool-side member that is capable of being detachably attached to the master plate is attached to the output measurement instrument.

4. The laser processing system according to claim 1, wherein the standby position is a position that is higher than the machining position of the laser beam from the laser nozzle.

* * * * *